Aug. 15, 1950      J. W. PECKHAM      2,518,996

MULTIPLE-ZONE TEMPERATURE CONTROL

Filed Jan. 22, 1948

INVENTOR.
Joseph W. Peckham
BY
George Lynn DeMott

Patented Aug. 15, 1950

2,518,996

UNITED STATES PATENT OFFICE 2,518,996

MULTIPLE-ZONE TEMPERATURE CONTROL

Joseph W. Peckham, Oakland, Calif., assignor to The Bristol Company, Waterbury, Conn., a corporation of Connecticut Application January 22, 1948, Serial No. 3,804

2 Claims. (Cl. 236—15)

This invention relates to automatic temperature control, and more especially to the regulation of temperature in ovens or similar enclosed spaces where it is desired to control, more or less independently, the temperatures as measured in different locations or zones, while at the same time rendering all of said temperatures subject to the domination of a common, or master, control.

In many types of industrial heating, it is customary to make use of a furnace or oven having a plurality of zones in each of which it is desirable that the temperature be individually regulated, either to maintain uniformity of temperature under varying conditions, or to establish a predetermined temperature gradient, while at the same time the general temperature level is independently controllable in response to variation of a condition which may be taken as representing the average temperature of the installation. Such conditions are encountered, for example, in conveyor furnaces, baking ovens and Herreschof burners.

It is an object of the present invention to provide means for so coordinating an associated group of temperature regulators with a single master regulator, as to cause the performance of the latter to dominate that of the former group, and to superimpose thereon a common characteristic which may be a function of the joint influence of the regulators of the group.

It is a further object to provide coordinating means as above set forth, in which the influence of the dominating controller upon the individual controllers of the group shall be individually adjustable with respect to each instrument in the group.

It is a further object to provide means, as above stated, in which the desired results shall be obtained primarily with equipment of standard and accepted design, with a minimum use of special or unusual parts.

In practicing the invention, it is proposed to provide in combination with a zoned furnace, oven, or other heating enclosure, a group of automatic controllers, each adapted to regulate the temperature in a single zone, and to provide a further controller responsive to temperature at a selected location in the installation and adapted to modify simultaneously the calibration or equivalent setting of the individual controllers of the group. Specifically, in conjunction with a group of control instruments utilizing an electrical method of temperature measurement, it is proposed to introduce into their individual electrical measuring circuits the influence of a master controller, a modifying influence whereby to modify their readings to the extent of rendering the over-all result of the controlling function responsive, not only individually to the separately measured temperature values, but also jointly to a temperature measured at a selected point.

Figure 1:
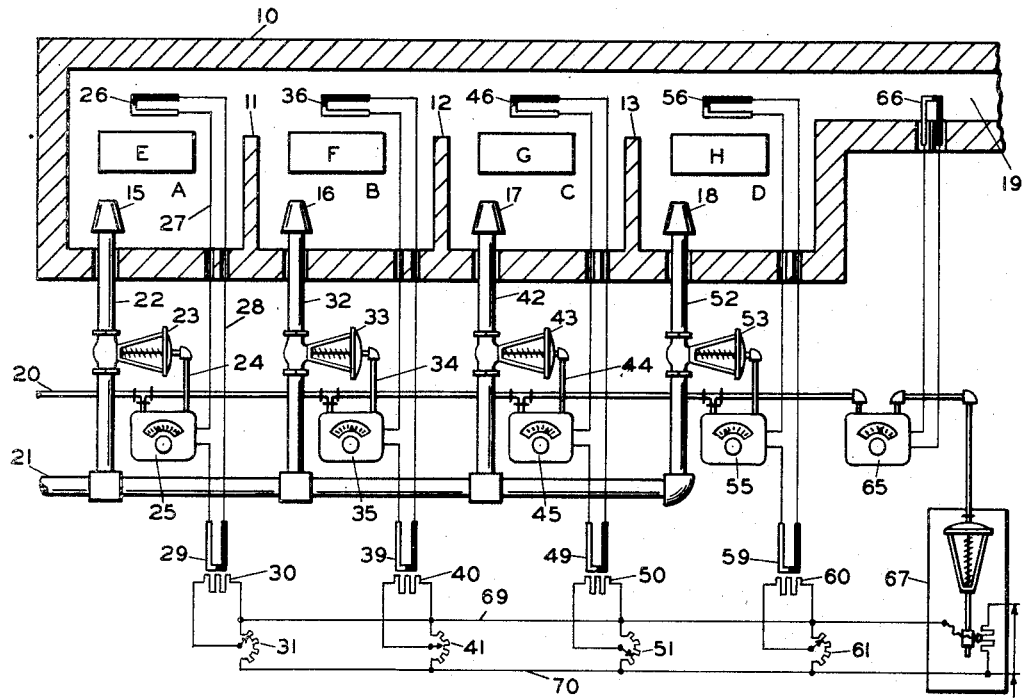
Fig. 1 is a diagrammatic representation of a zoned furnace having associated therewith a combination of controllers utilizing thermo-electric elements and embodying the principles of the invention.

Referring now to the drawings:

In Fig. 1, the numeral 10 designates a furnace or oven divided into a number of sections or zones A, B, C, D, by partitions 11, 12 and 13, and containing workpieces E, F, G, and H, respectively adapted to be heated by burners 15, 16, 17, and 18, which admit fluid fuel to said zones for combustion. The products of combustion of all zones of the furnace 10 discharge into a common stack or chimney 19, and thence to the atmosphere. The numeral 20 designates a supply source of pressure fluid (e. g. compressed air) for actuating the control devices; and 21 designates a source of fluid fuel adapted for combustion in the burners 15, 16, etc.

As typical of the manner in which individual control of the temperatures in the several zones is accomplished, reference may be had to the automatic regulation of fuel supply to the burner 15 located in the zone A, and predominantly responsible for heating the workpiece E. The burner 15 is supplied with fuel from the source 21 through a pipe 22 having therein a pneumatic motor-valve 23 adapted for actuation by variable air pressure supplied through a conduit 24. A regulating instrument or controller 25 which includes a measuring element responsive to changes in an applied electromotive force, and, subject to the influence thereof, serves to vary the pressure of air derived from the source 20 and in turn admitted to the conduit 24. The instrument 25 may be of any one of a variety well-known in the art of automatic control, a preferred form being that disclosed and claimed in U. S. Letters Patent No. 2,326,238 granted to A. R. Mabey August 10, 1943. Instruments of this type incorporate a potentiometer-type measuring element adapted to position a moving member in accordance with the value of an electromotive force applied between the terminals thereof, and thus to regulate the pressure of air in a conduit, and the pressure may be applied to the motor element of a pneumatic valve operator. Means are also provided for varying the relation between regulated air pressure and applied electromotive force, thus providing a control-point setting.

Suitably related to the workpiece E to partake of the temperature characteristic thereof is a thermocouple 26, having attached thereto two conductors 27 and 28, of which the former is connected to a terminal of the controller 25, and the latter to an element of a further thermocouple 29. The free element of the couple 29 is connected to the free terminal of the controller to complete an electric circuit in which the total electromotive force, represented by the algrebraic sum of the potential differences in the couples 26 and 29, is applied to the measuring element of the instrument 25. Thus, according to the well-known principles of automatic regulation, the controller 25, acting through the valve 23, will tend to maintain at the burner 15 a supply of fuel directly subject to the joint influence of the thermocouples 26 and 29, and, if the temperature of the latter couple be maintained constant, tending to hold at a constant value the temperature of the workpiece E, as determined by the thermocouple 26.

In thermal-exchange relation to couple 29 is a resistor-type electric heating element 30, connected to, and adapted to be energized from, an adjustable voltage divider 31 supplied from a variable-voltage source presently to be described.

A control system identical in all respects with that by which the temperature in the zone A is regulated, is provided for the zone B by a pipe 32 supplying fuel from the source 21 through a pneumatic motor-valve 33, receiving air through a conduit 34 from an electro-pneumatic regulator 35. Regulator 35 is responsive to the joint influence of two thermocouples 36 and 39, the former of which is juxtaposed to the workpiece F to measure its temperature, and the latter of which is mounted in heat-transfer relationship to a resistance-type heater 40 adapted to be energized from an adjustable voltage divider 41.

Similarly, pipes 42 and 52 supply fuel from the source 21 to the burners 17 and 18 in zones C and D, respectively, the flow of said fuel being regulated by pneumatic-motor valves 43 and 53, receiving air through conduits such as 44 from regulators 45 and 55, identical in all respects with the regulators 25 and 35, and responsive to the joint influence of two thermocouples 46 and 49, and 56 and 59, the former of each pair being juxtaposed to the workpiece G, and the latter of each pair to heating elements 50 and 60 energized from adjustable voltage dividers 51, 61.

A control instrument 65, which may be similar to the hereinbefore described controllers 25, 35, etc., is rendered responsive to the electromotive force developed in a thermocouple 66 mounted in the stack 19, and regulates the pressure of air derived from the source 20 and applied to the motor-element of a pneumatically actuated voltage regulator or rheostat 67, to render the setting of said regulator dependent upon the temperature to which the couple 66 is exposed. The electrical element of the regulator 67 is supplied with power from a source 68, and is adapted to deliver its regulated output to a pair of conductors 69 and 70, across which are connected the several voltage dividers 31, 41, 51 and 61.

Thus, the voltage impressed upon the voltage dividers is subject to variation in accordance with the temperature to which the thermocouple 66 is exposed; and the portion of said voltage applied to each of the heaters 30, 40, 50, and 60 will depend upon the individual setting of the respective one of the adjustable voltage dividers 31, 41, 51, and 61 to which said heater is electrically connected.

Operation of the control system may best be understood by first considering the performance of the control apparatus in its relation to one of the several zones in which temperature values are under regulation. As previously pointed out, the temperature of the workpiece E in zone A will tend to attain a constant value, subject to adjustment by setting the control point on the instrument 25, and assuming that the thermocouple 29 is maintained at a constant temperature. This is in accord with the well-known principles of automatic control, and will be obvious without further explanation. Upon the application of potential from the voltage divider 31 to the heater 30, the temperature of the couple 29 will tend to rise, introducing into the measuring circuit of the controller 25 an electromotive force which, according to the polarity of the couple 29 with respect to that of the couple 26, will tend to supplement, or to oppose, that of the last-named couple, thus modifying the measured temperature, and causing the controller to either raise or lower, as the case may be, the regulated temperature, with respect to the setting of the control point.

In the same manner, the temperatures in the zones B, C, and D will be modified according to the temperatures of the heaters 40, 50, and 60, respectively; and, since, through their associated voltage dividers, these heaters are all energized from a common source composed of the conductors 69 and 70, and since, the voltage between said conductors is responsive to the temperature of the thermocouple 66 in the stack 19, it follows that the temperatures in the several zones of the furnace, in addition to being regulated by the individual controllers 25, 35, 45, and 55, will be subject to a superposed influence, and will tend to vary simultaneously according to the temperature of the escaping products of combustion. Adjustment of the settings of the several voltage dividers 31, 41, etc., will, therefore, control the extent to which the potentials introduced into the respective measuring circuits by the couples 29, 39, etc. dominate those developed by the measuring couples 26, 36, etc., and thus render selectively adjustable, the magnitude of response of the temperature in each zone to that in the stack 19.

Figure 2:
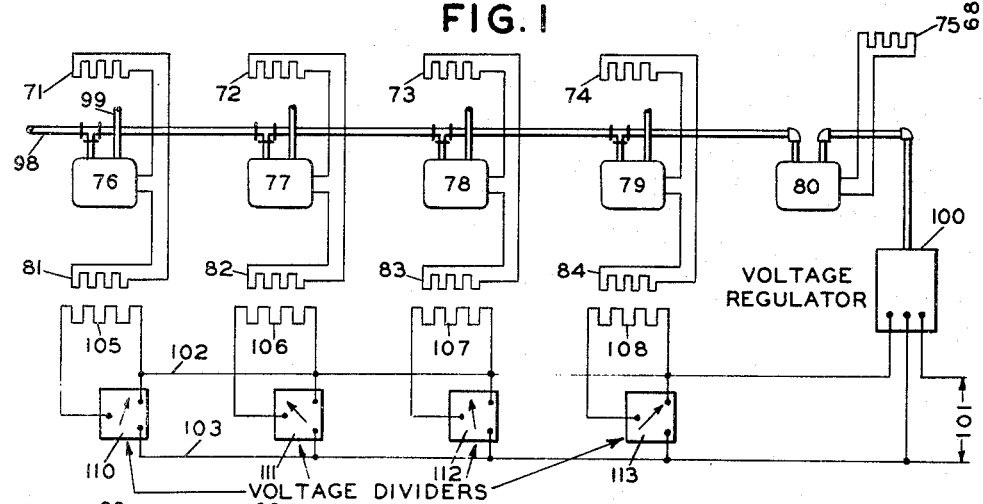
Fig. 2 is a diagram of a modified control arrangement utilizing resistance elements.

The form of the invention shown in Fig. 2 is essentially similar to that shown in Fig. 1, with the outstanding distinction that the temperature-responsive control instruments in Fig. 2 are actuated on the principle of the resistance thermometer, rather than the thermoelectric potentiometer-pyrometer. As in Fig. 1, the installation is shown in its application to a furnace having four zones, similar in all respects to the zones A, B, C, and D in Fig. 1, and similarly heated by the combustion of fuel in individual burners under control of pneumatically actuated valves of the type shown in Fig. 1 but omitted from Fig. 2. Four temperature-sensitive resistance units 71, 72, 73, and 74 are positioned in the four zones of the furnace, and a further temperature-sensitive resistance unit 75 in the stack. These resistance units are connected in the external measuring circuits of controlling instruments 76, 77, 78, 79 and 80, respectively; and in series with the first four named of said circuits are further temperature-sensitive resistors 81, 82, 83 and 84.

Figure 3:
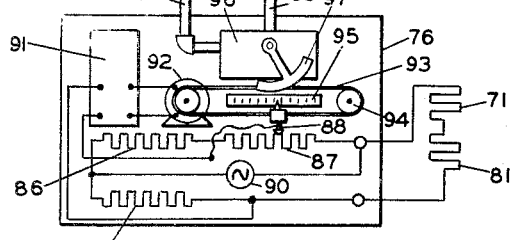
Fig. 3 is a diagram, showing the details of an instrument suitable for use in the system of Fig. 2.

While the controlling instrument 76 may take any one of a number of well-known forms of resistance-thermometer-actuated regulators, one form which it may assume is shown diagrammatically in Fig. 3. An electrical bridge network is comprised of two "ratio" arms 85 and 86, a slide wire resistance unit 87 having a movable contact 88 associated therewith, and a fourth arm including the external variable resistors 71 and 81, said arms being interconnected to form a closed loop. Alternating electromotive force from a source 90 is impressed upon the network at the point between the ratio arms 85—86, and the point between the adjustable arm 87, and the external variable resistors. The movable contact 88 and the point between the arm 85 and the external resistors are connected to the input side of a conventional amplifier 91; and the output side of said amplifier is connected to a reversible motor 92, for operating said motor in a direction, and with an intensity, dependent upon the extent of unbalance of the bridge network.

By means of a suitable mechanical connection, here indicated as a flexible band 93 looped over the pulley of the motor 92 and a further pulley 94, mechanical connection is provided between said motor and the sliding contact 88, to cause the operation of the motor in response to a condition of unbalance in the bridge network and tending to position said contact along the slide wire 87 and restore the bridge to a condition of balance. The translated position of the contact 88 thus becomes a measure of the combined resistance of the external units 71 and 81; and, if the latter be maintained at a constant reference temperature, the temperature of the former may be read from a graduated scale 95 fixed to the frame of the instrument and co-operating with the sliding contact 88.

Regulation in response to the measure provided by the position of the sliding contact 88 is effected by means of a pneumatic control unit 96, which, while available in any one of a number of practical forms, may preferably be of the general type set forth in U. S. Letters Patent No. 1,880,247, issued to A. R. Mabey et al., October 4, 1932. In that instrument a small frictionless vane is movable between opposed escape jets, and in cooperation with suitable pneumatic relay means, serves to maintain the pressure of control air derived from a constant pressure source at a value proportional to the displacement of said vane with respect to said jets. The control unit 96 is provided with a quadrant 97, through which connection is made to the band 93, to position internal elements as set forth, and so regulate the flow of compressed air derived from a supply source 98 as to provide at an outlet conduit 99 leading to one of the pneumatic motor-valves, similar to those shown in Fig. 1, a pressure which is a function of the position of the contact 88, and therefore of the temperature to which the resistance unit 71 is exposed. The controlling instruments 77, 78, and 79 are identical in their construction and operation with the instrument 76, and, being operatively connected to the temperature-sensitive resistors, 72, 73 and 74, respectively, tend to maintain at predetermined temperatures the furnace zones in which said resistors are severally located.

The control instrument 80, having the stack resistor 75 connected in its measuring circuit, is adapted to receive air from the source 98 and deliver it under controlled pressure to a pneumatically actuated voltage regulator 100, which may be similar to the regulator 67 in Fig. 1. In such a regulator electrical energy from a source 101, passing through the regulator will be supplied to a pair of conductors 102—103 at a voltage dependent upon the temperature to which the sensitive resistance unit 75 is exposed. The temperature-sensitive resistance units 81, 82, 83, and 84, connected respectively in the measuring circuits, of the instruments 76, 77, 78, and 79, are in turn placed in thermal exchange relationship with resistance-type heaters 105, 106, 107, and 108 supplied through independently adjustable voltage dividers 110, 111, 112, and 113, respectively, from the variable-voltage source provided by the conductors 102—103.

So long as the heaters 105, 106, etc. are maintained at constant and predetermined temperatures, the control of the several zone temperatures by the instruments 76, 77, etc. under the influence of the corresponding temperature-sensitive resistance units 71, 72, etc. will be subject only to the temperatures to which said sensitive units are exposed in said zones; but, upon variation in the temperature of any of said heaters, the sensitive resistors 81, 82, etc., will respond, varying the total resistance values of the several measuring circuits, and superposing upon the normal control a further influence representative of the temperatures attained by said heaters. Since the voltage impressed by the conductors 102—103 upon the several heaters is subject to the regulator 100, as modified by the settings of the individual voltage dividers 110, 111, etc., and since the potential between said conductors is dependent upon the temperature of the sensitive resistor 75, it follows that the temperatures in the several zones of the furnace, in addition to being regulated by the individual controllers 76, 77, 78, and 79, will be subjected to the superposed influence, and will tend to vary simultaneously according to the temperature of the escaping products of combustion. It will further be apparent that adjustment of the settings of the several voltage dividers 110, 111, etc. will render selectively adjustable the magnitude of response of the temperature in each zone with relation to that in the stack.

While the invention in the two forms set forth has shown the master controller as being subject to temperatures measured in the stack through which escape the products of combustion, it will be apparent that the temperature to which said control instrument is responsive may be measured at any selected location about the furnace, or elsewhere in the installation. It will further be apparent that, while all the controllers shown in Fig. 1 are indicated as of the thermocouple type, and all those in Fig. 2 as of the resistance-thermometer type, there is nothing in the invention or in its application to preclude the use of the two types, suitably combined, in a single installation.

Having thus described my invention, what is claimed is:

1. In a control system for a heating furnace having a plurality of zones to be independently regulated and having a common portion whose temperature is subject to the joint influence of the temperatures in the several zones, a fuel burner in each of said zones, a thermo-electric element in each of said zones, an electro-responsive regulator for each of said burners to control the admission of fuel thereto, a circuit operatively connecting each of said thermo-electric elements to a corresponding one of said regulators to maintain the temperature in the associated zone at a predetermined set value, a further thermo-electric element in each of said connecting circuits and adapted to modify the response of the associated regulator, a temperature sensitive element in said common portion of the furnace, a regulator responsive to said last-named element, and means subject to said regulator to adjust simultaneously the temperatures of said modifying thermo-electric elements in accordance with variations of temperature in said common portion.

2. In a control system for a heating furnace having a plurality of zones to be independently regulated, and having a common portion whose temperature is subject to the joint influence of the temperatures in the several zones, a fuel burner in each of said zones, a temperature-sensitive resistance element in each of said zones, a resistance-responsive regulator for each of said burners to control the admission of fuel thereto, a circuit operatively connecting each of said resistance elements to a corresponding one of said regulators to maintain the temperature in the associated zone at a predetermined set value, a further temperature sensitive resistance element in each of said connecting circuits and adapted to modify the response of the associated regulator, a temperature sensitive element in said common portion of the furnace, a regulator responsive to said last-named element, and means subject to said regulator to adjust simultaneously the temperatures of said modifying resistance elements in accordance with variations of temperature in said common portion.

JOSEPH W. PECKHAM.

REFERENCES CITED

The following references are of record in the file of this patent:

UNITED STATES PATENTS

| Number | Name | Date |
|---|---|---|
| 2,148,491 | Moore | Feb. 28, 1939 |
| 2,181,427 | Grant | Nov. 28, 1939 |
| 2,205,182 | Whitten | June 18, 1940 |
| 2,216,301 | Sparrow | Oct. 1, 1940 |
| 2,286,741 | Krogh | June 16, 1942 |
| 2,337,410 | Peters | Dec. 21, 1943 |
| 2,372,307 | Alexander | Mar. 27, 1945 |
| 2,376,488 | Jones | May 22, 1945 |